Patented June 6, 1950

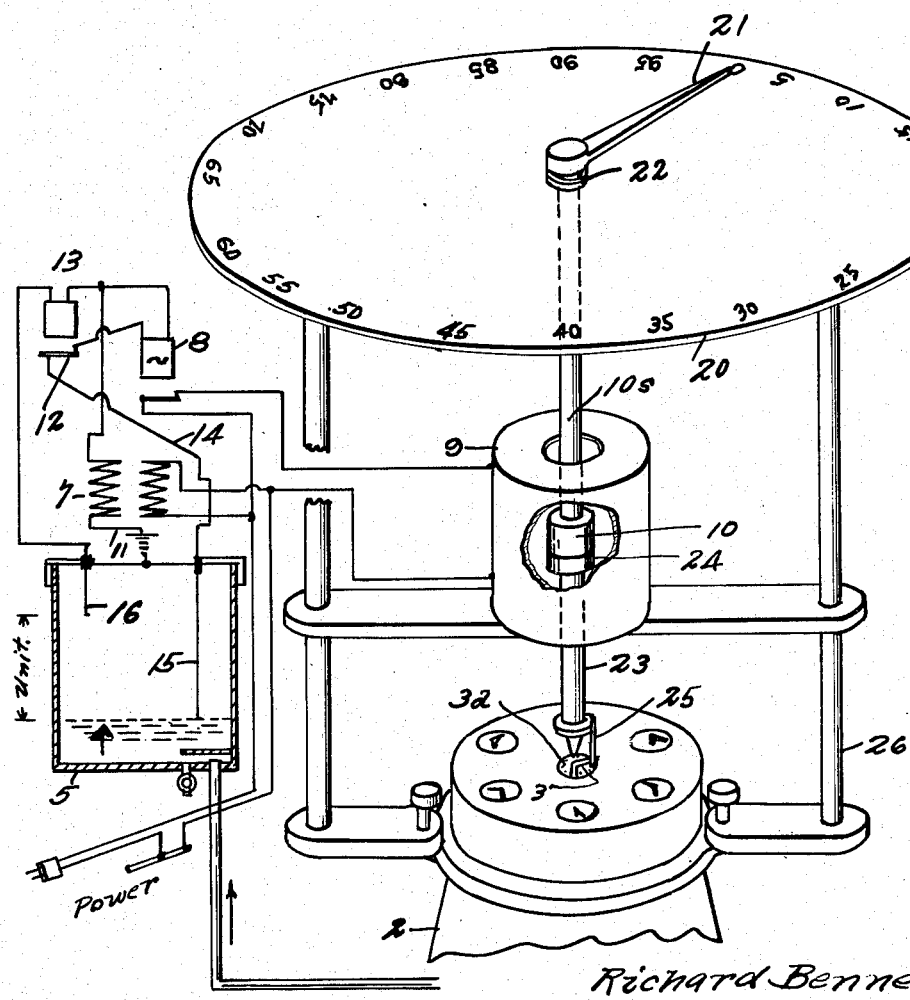

2,510,327

UNITED STATES PATENT OFFICE 2,510,327

TESTING APPARATUS FOR FLUID METERS

Richard Bennett, Phoenix, Ariz.

Application April 19, 1947, Serial No. 742,663

20 Claims. (Cl. 73—3)

This invention is an apparatus for making accuracy tests of running flow fluid meters, and particularly concerns a device for testing water meters.

Much difficulty has heretofore been met in making accurate quantity flow tests of meters commonly used for running liquid measure.

Suitable equipment for testing large meters has been so lacking that large meters are seldom, if ever, tested, except on very low flows and by very unsatisfactory methods on high rate of flow where the water hammer set up cannot be ignored, but even here the human element control renders the results of little or no value.

Today, there is no well known water meter tester which will test automatically and all must be done on machines in which the human element is used to such an extent that the results obtained, except by accident or the law of averages, are of little value, if any.

There is no marketed machine which will test water meters without destructive water hammer. Small meters are now tested with quick-closing valves which set up water hammer but not of a completely destructive nature. On the other hand there is no well known testing device by which large meters can be tested by volume control. Makeshift means and methods must be used, in common practice, because large meters could not be tested by means using quick opening and quick closing control valves because of dangerous water hammer. With these objections in view it is an object of this invention to provide a means and method to eliminate possible, dangerous water hammer, especially during the actual test of the meter.

Another object of the invention is to provide an automatic and accurate apparatus for testing liquid flow meters with rapidity and economy and without generation of water hammer, in a manner not herebefore effected.

A purpose of the invention is to provide a method and means whereby the fluid is permitted to accelerate from a standing start to a normal speed of flow in a given meter and at that time to commence measurement of quantity flow, and whereby the measurement is automatically stopped at the instant that the desired unit of volume has passed from the meter to and been collected in a unit measuring tank, and which invention provides for the diminution of flow, after volume measurement, at any desired rate, the instant invention being in no manner affected by the falling speed.

A further purpose of the invention is to provide a liquid flow meter tester wholly free of the frailty of manual attention and which is automatic in starting the test cycle after normal running rate is achieved, and which automatically stops the test cycle when an accurate, given unit volume of the liquid has been checked from the tested meter.

An additional object of the invention is to provide a meter tester which may be easily, rapidly and reliably attached to a given meter without any changes in the construction of the meter or in the positions of the elements thereof.

Also, an object of the invention is to provide a tester which requires no technical mathematical processes and can be handled by a clerk or operator of average education and mechanical training, and which is very simple, compact, substantial and light in weight.

To accomplish rapid tests of meters, an object of this invention is to provide a means which requires but little more than one full measurement unit to have passed the given meter, in contrast to the much greater volume heretofore used on such tests.

And a purpose is to provide a tester in which it is entirely practical to combine a large faced test scale dial enabling a test reading as fine as one-quarter (¼) of one percent.

A noticeable purpose of the invention is to provide a meter tester of such structural features that all reference reading of the dial of the tested meter is avoided; an object in this connection being to provide a test dial pointer which is motivated directly by the usual unit hand of a dial of the meter.

An advantage had by the invention is that in its use it does not become necessary to re-set the dial hand of the meter to be tested back to its zero position before commencing to run the meter for a test in conjunction with this tester, since the test pointer of this invention can be set at its zero, or starting, position at will and it can be coupled for drive by the meter hand at any position of the latter.

The invention resides in divers advancements in this particular art set forth in the ensuing disclosure and has, with the above, additional objects and advantages as hereinafter developed, and whose constructions, combinations and means and details thereof, and the manner of operation and the method will be made manifest in the following description of the herewith illustrative embodiment; it being understood that modifications, variations and adaptations may be resorted to within the scope, spirit and principles of the invention as it is claimed in conclusion hereof.

The drawing is a diagram of the apparatus; with the meter hand in driving, coupled relation with the tester pointer to sweep it over its unit dial.

While a number of desired meters may be tested at one time by the illustrated apparatus a single liquid meter 2 is indicated and has the usual unit scale hand 3 rotative by the given flowing liquid (water being referred to hereinafter).

The tester includes a suitable, handy volumetric tank 5 to which water from the meter 2 is discharged during the test.

The tank is electrically grounded in circuit with a suitable transformer 7 which is connected to a normally open relay 8 which is in series connection with a suitable solenoid winding 9 having a normally elevated, ferrous core 10 to be lowered electrically when the relay 8 is energized (as shown).

The relay 8 is wired to the output side of the transformer 7 which is grounded to the tank 5 by line 11, and this relay is connected to switch 12 of a normally closed relay 13 and thence by line 14 to a contact rod 15 terminating well down in the tank 5 to be electrically contacted by rising water from the meter 2.

When the water engages the rod 15 current flows through the closed switch 12 and closes the relay 8 to excite the solenoid 9 and thereby draw down its core 10.

The supply water valve (not shown) of the meter 2 now being open, water constantly rises in the tank until it engages a contact rod 16 whereby the relay 13 is energized, through connection with the transformer, and acts to break the circuit to the relay 8 and the solenoid is deenergized.

Means are provided whereby to drivably connect the hand 3 of the meter being tested to the rotative core 10. This core has an affixed coaxial, upstanding shaft 10s passing through a test unit dial 20, suitably calibrated and preferably of considerable size so as to enable readings as fine as one-quarter of one percent (it being scaled into fractions of hundredths, for instance). On the upper end of the shaft is fixed a test pointer 21 rotative over the dial divisions from zero in one cycle per volume unit, and continuing its rotation in some tests, as later set out.

A suitable device, as spring 22, urges the core and its shaft 10s upwardly a suitable degree.

Coaxially below the core 10 is a spindle 23 turnably bearing in the solenoid and having a coupling disc 24 adapted to be engaged by and drive, rotatively, the core 10, when this is pulled down by the energized solenoid. The disc 24 is preferably non-ferrous, and not drawn by the solenoid.

Fixed on the lower end of the spindle is a finger 25 interposed in the orbit of and constantly engaged by the meter hand 3 so that when water is running through the meter to the tank the spindle is rotating. Thus there is a constant operative connection between the driving hand 3 and the disc, but the core 10 is normally held by the spring 22 just out of driving engagement with the disc. Therefore, the shaft pointer 21 is free to be set at any time to read on the zero index of its dial 20, whose full scale indexes one given volume unit (complementary to the dial unit). Thus if the meter rate of water flow is accurate the meter hand and the test pointer will be in direct and correct time and indicating relation—will make full cycles in unison if and when the spindle is driving the core and its connected pointer 21.

In order to prove the rate of flow of water through the meter 2 the following operation and method applies: The tester spindle 23 is arranged coaxially with the axis of the hand 3, as by securely affixing the tester solenoid frame 26 to the given meter 2 which is piped to discharge to the tank.

The control valve (not shown) of the meter is now opened as fast as desired and water from the meter flows to the tank until full acceleration flow is had in the meter 2, the spindle 23 turning with the hand 3 without effect on the unclutched, spring elevated core 10 and its shaft 10s. The water, at full or presumed or intended rate of meter flow, now rises in the tank and engages the lower end of the fixed, circuit rod 15, whereupon the current closes the normally open relay 8 and the power circuit of the solenoid coil is closed to energize the coil and therefore pull down the core 10 and this engages and is at once rotatively driven by the spindle disc 24; under force of the rotating meter hand 3.

The meter is now passing water at its full normal operating speed and the meter hand 3 and the test dial pointer are turning in unison. It is to be noticed that the tester pointer did not begin to run until after the initial water spent in accelerating the meter mechanism had actually passed through the meter and had accumulated in the test tank up to a level somewhat below the bottom end of the contact rod 15; water contacting the rod only after its rate of meter flow had reached normal rate.

Having reached the contact level of the bottom end of the rod 15 (and effecting the closing of the core clutch) the trapped water will continue to rise at a regular rate (unless the meter is faulty) until it engages the lower end of the fixed contact rod 16 and this will close the contact relay 13 and break the circuit to the relay 8 to deenergize the solenoid coil and allow the spring 22 to instantly pull the core 10 from driving engagement with the drive disc 24. The testing pointer 21 will now stop even though the meter hand 3 will continue to run so long as the water is running through the meter.

At the instant that the meter rate testing pointer 21 stops over its dial the meter control valve can be gradually closed to avoid harmful water-hammer; which will be a great advantage when the meter being tested is of medium and high capacity.

The volume of water that has been collected in the tank between the levels of the bottom ends of the two rods 15 and 16 is a unit exactly equal to that indicated by the scale of the test dial 20 and equal to the unit intended to be measured by the hand 3 over its dial 3d. And one cycle of the test pointer 21 will show that one full unit of water has passed through the tested meter.

Therefore, if, during the closed period of the solenoid circuit 9 (from the bottom level of the rod 15 to the higher level of the bottom end of the rod 16) the test pointer 21 does not make a first and full cycle over its dial 20 then it is evident that the meter 2 positively tests as giving overmeasure of water since the amount passed by the meter is more than the amount shown on the meter dial 3d and the tester dial 20. That is, a full unit of water has closed and opened the solenoid clutch but neither the hand 3 nor the pointer 21 has yet completed a unit cycle on its respective dial.

On the other hand, if the test pointer 21 runs past a full cycle on its dial before the contact rod 16 is contacted by the rising water, (to de-clutch the core 10) then it is positive indication that the meter 2 is indicating a greater amount of passed volume of water than has actually gone through the meter.

After the circuit of the rod 16 has been closed the excess and unregistered water rising on the rod can be overflowed from the tank or retained as desired, according to the value of the material; it had no operative effect on the testing meter, and is only water spent in the deceleration of the meter as its control valve is closed. Acceleration water from the meter is not indicated on the testing dial; water flowing in the meter at normal rate is collected in the tank and dial registered; deceleration water is collected (or wasted) and is not indicated on the test dial.

What is claimed is:

1. An apparatus for testing liquid flow meters and which registers only a volume unit which has passed through a given meter at normal function flow rate of the meter, said apparatus including a tank for receiving liquid from the meter and to be volume tested, a testing device having a related pointer and unit dial corresponding to a unit dial of the meter and having a part adapted to be engaged and driven by the hand of said meter dial, a normally open clutch for engaging cooperatively with said part and which drives the said pointer by action of the said hand, and means adapted to be controlled by the unit volume of the liquid rising in the tank for effecting closure and subsequent opening of the said clutch.

2. The apparatus of claim 1; and the tank having capacity to receive liquid during initial acceleration of flow in the meter before any effect on said means; said means including an electric system controlled by the liquid and flowing to the tank at the then rate of flow in the meter.

3. The apparatus of claim 1; said means including an actuator for closing the clutch and which is ineffective on the clutch until there is a rate of flow from the meter at its then operating effectiveness.

4. The apparatus of claim 1; said means including a normally-open-circuit clutch solenoid whose circuit is completed and kept closed during and by rise of the unit volume of liquid in said tank.

5. The apparatus of claim 1; said means including a solenoid for the clutch having controllers with circuit terminals in the tank spaced at liquid demarkation levels and whose circuits are respectively closed and broken when the liquid reaches the said terminals.

6. The apparatus of claim 1; said means including a normally-open-circuit solenoid for the clutch, and relay circuits having terminals at different levels in the tank and which close and open the solenoid circuit when engaged by the liquid rising between the terminals.

7. A liquid meter testing apparatus having, in combination; a tank, a rotary meter coupler including a finger part adapted to engage and be rotated by a unit hand of a given liquid meter during its operation, a tester unit dial and a pointer rotative thereover, a clutch means for connecting the pointer to the said meter driven part and a clutch controlling device including parts adapted to be made operative only by and under control of a unit volume of liquid passed from the meter to the tank and as said volume is rising in the tank to shift the clutch.

8. The apparatus of claim 7; the pointer being normally idle as to the finger part so that the finger may be meter driven without effect on the pointer, and said device including an electrical circuit operative to shift the clutch into closed position.

9. The apparatus of claim 7; said device including an electrical circuit including a clutch control feature and having control terminals in the tank spaced apart at levels between which a given unit volume of the liquid will collect as delivered from the meter; said circuit being closed by the liquid as it reaches the bottom level of the unit volume to effect clutch engagement between the pointer and the finger part and the circuit being broken as the liquid reaches the top level of the risen unit volume.

10. An apparatus for testing a liquid flow meter having a running, unit dial hand, said apparatus including a device having a unit dial corresponding, in measure, to the unit dial of the meter and having a pointer movable over the test dial and which includes a pointer driving part engageable with and drivable by the meter hand, whereby while the meter is in its normal operation the test pointer is shifted over the test dial, a tank receiving liquid to be measured from the meter.

11. The apparatus of claim 10; and means, controlled by water in said tank from the meter, for effecting engagement and disengagement of the said part as to the test pointer.

12. The apparatus of claim 10; and including means for normally disengaging said pointer from the said part, and means controlled by rise of liquid between certain levels in the tank for effecting pointer driving engagement by said part.

13. The apparatus of claim 10, and including means for normally disengaging said part from said pointer, and means having controls in said tank and adapted to effect engagement of the pointer with said part while the latter is in normal operation by the metering hand.

14. An apparatus for testing liquid flow meters of the type having a running, unit dial hand; the apparatus including a dial calibrated to correspond to the meter unit of measure, a running pointer for the test dial, and coupling means including a part normally operatively engaging the meter hand to be driven thereby; said means including a part connected to the pointer to effect its rotation in equal degree to travel of the said hand.

15. The apparatus of claim 14, and clamp means combined with test dial for fixing the apparatus on the meter for operative combination therewith.

16. The apparatus of claim 15; and a frame part holding the pointer and said hand on a common axis of rotation.

17. The apparatus of claim 14; and means engaging said pointer part to normally open the coupling means and prevent pointer drive.

18. The apparatus of claim 17, and means including a tank for liquid from the meter having controls with parts made effective by rising liquid one of which is for closing the coupling means while the meter hand is in normal operation.

19. A fluid flow meter testing device including a unit dial corresponding to the unit of measure of the given meter, a pointer operative over the said dial, a part adapted for constant, normal engagement with a unit hand of the meter to be driven thereby during normal action of the hand, and a coupling mechanism including a member connected to the pointer and a member connected to said part for coupling said part to the pointer.

20. The device of claim 19; and means adapted to be controlled by a unit volume of liquid from the meter during its normal operation for effecting closure and opening of the said mechanism, and including a tank and an actuator for the pointer member and having controls one of which closes the clutch as liquid rises in the tank and the other of which frees the clutch at a given higher level of the liquid.

RICHARD BENNETT.

REFERENCES CITED

The following references are of record in the file of this patent:

UNITED STATES PATENTS

| Number | Name | Date |
|---|---|---|
| 1,124,055 | Moorefield et al. | Jan. 5, 1915 |
| 1,747,439 | Huettig | Feb. 18, 1930 |
| 2,039,506 | Wagner et al. | May 5, 1936 |
| 2,202,197 | Ewertz | May 28, 1940 |
| 2,230,137 | Ewertz | Jan. 28, 1941 |
| 2,233,297 | Polin et al. | Feb. 25, 1941 |
| 2,385,161 | Pinkerton | Sept. 18, 1945 |